United States Patent [19]

Steigerwald

[11] 4,404,472
[45] Sep. 13, 1983

[54] MAXIMUM POWER CONTROL FOR A SOLAR ARRAY CONNECTED TO A LOAD

[75] Inventor: Robert L. Steigerwald, Scotia, N.Y.

[73] Assignee: General Electric Company, Schenectady, N.Y.

[21] Appl. No.: 334,845

[22] Filed: Dec. 28, 1981

[51] Int. Cl.³ .................................................. H02J 3/38
[52] U.S. Cl. ....................................... 307/46; 320/32; 323/906; 363/80
[58] Field of Search ....................... 363/17, 80, 96, 98; 323/906, 300; 307/45, 46; 320/32, 35

[56] References Cited

U.S. PATENT DOCUMENTS

| 3,384,806 | 5/1968 | Hartman | 323/906 |
| 3,626,198 | 12/1971 | Boehringer | 323/906 |
| 4,059,772 | 11/1977 | Wilkerson | 363/136 |

OTHER PUBLICATIONS

"An Inverter/Controller Subsystem Optomized for Photovoltaic Applications," Conf: 13th IEEE Photovoltaic Specialists Conf., 1978, pp. 984-991, Wash. D.C., USA (Jun. 5-8, 1978).

"The Design of a Photovoltaic System for a Southwest All-Electric Residence", Feb. 1980, Sandia National Lab., Sand 79-7056, pp. 5-26/5-28.

*Primary Examiner*—William H. Beha, Jr.
*Attorney, Agent, or Firm*—William H. Steinberg; James C. Davis, Jr.; Marvin Snyder

[57] ABSTRACT

An analog and a digital control is provided which causes a dc to ac inverter operated in the constant power mode to supply sinusoidal current to a utility while drawing maximum power from a solar array. The current drawn from the array is forced to be proportional to the array voltage by a variable gain amplifier so that the inverter presents a resistive load to the array which remains statically stable under rapid changes of insolation while using a perturb-and-observe method of maximum power tracking. The perturb-and-observe method adjusts the gain of the variable gain amplifier to achieve maximum power output from the solar array.

6 Claims, 8 Drawing Figures

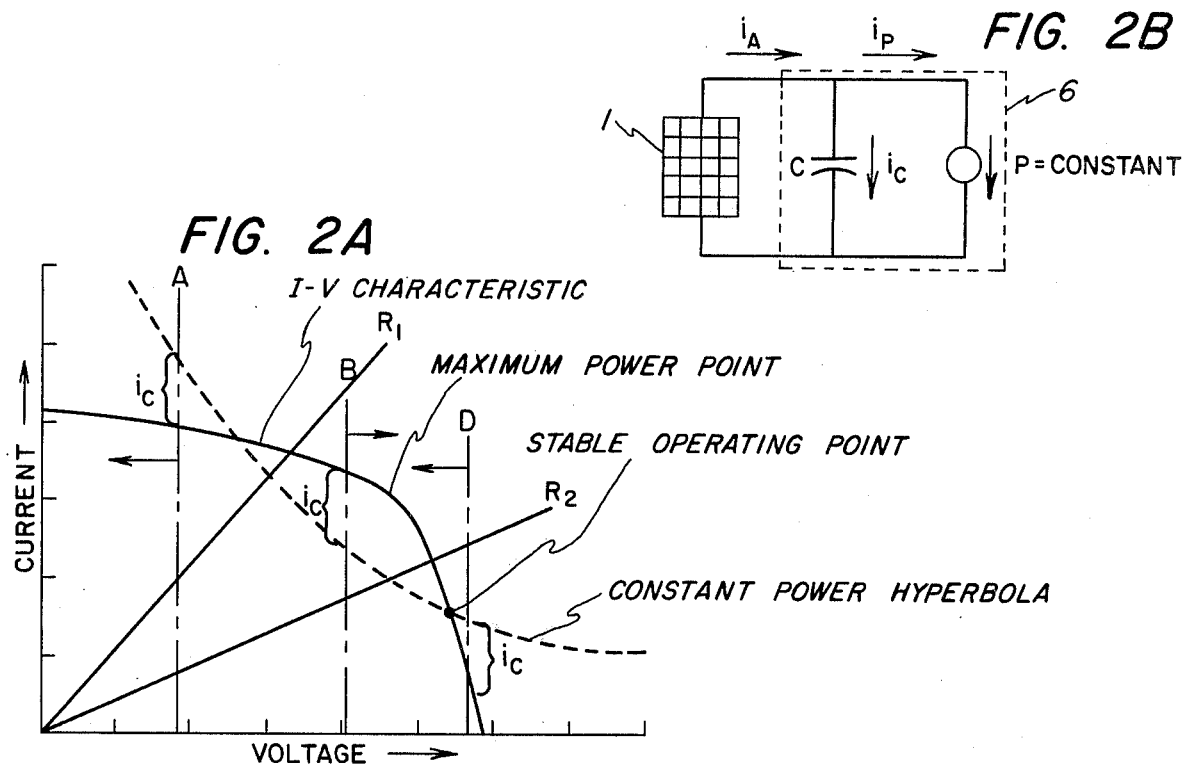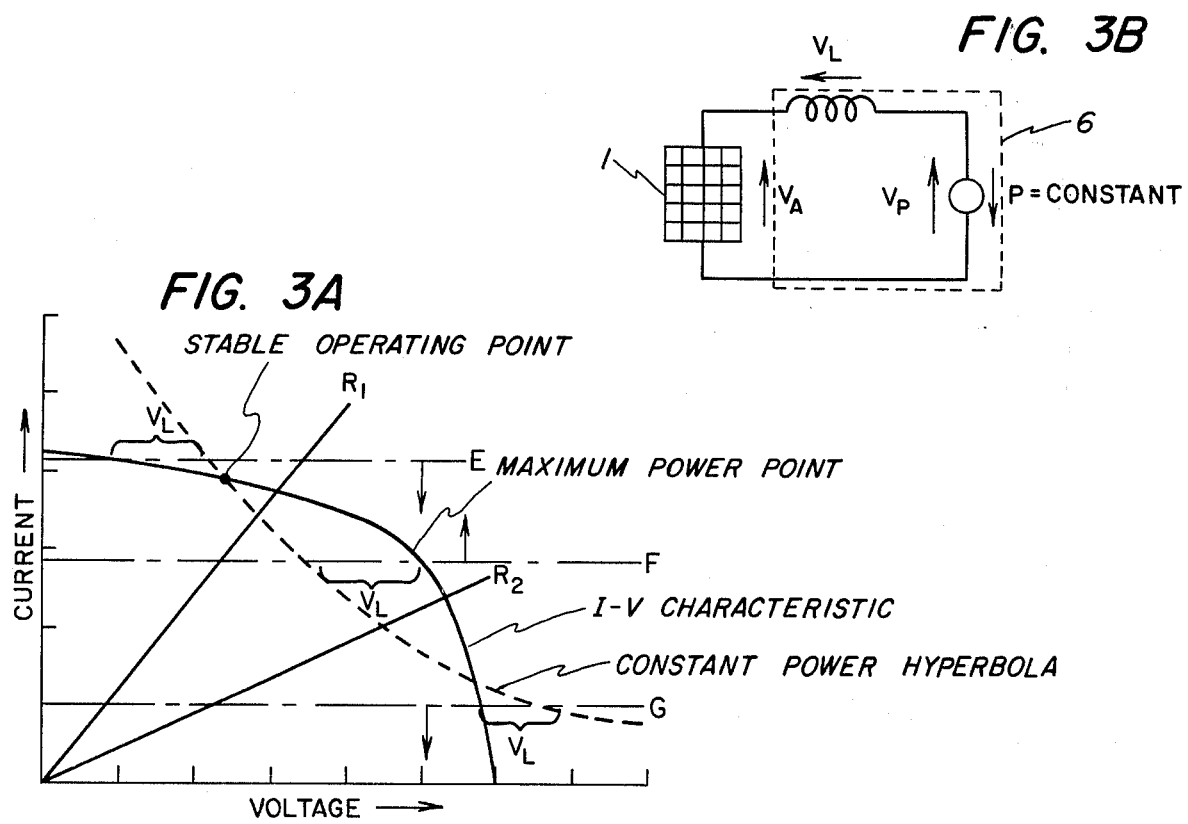

MAXIMUM POWER CONTROL FOR A SOLAR ARRAY CONNECTED TO A LOAD

This invention relates to a control for providing a current command to a power converter interfacing a solar array with a load to draw maximum power from the array. "Converter," as used herein, refers to dc to ac inverters and dc to dc converters.

In order to interface the output of a solar array to a utility grid, a dc to ac inverter is needed to change the direct current direct voltage output of the solar array into a 60 Hz sinusoidal current waveform which feeds power to the utility grid.

Power inverters are normally operated in a constant power mode when supplying a constant voltage load. The constant power mode is achieved by regulating the current delivered to the constant voltage load. The constant power mode of operation, as well as the type of inverter (current controlled or voltage controlled) connected to a solar array determines which portions of the solar array I-V characteristic stable operation can be achieved. The I-V characteristic of a solar array is the relationship of the solar array current and solar array voltage for a particular level of insolation and temperature. The characteristic gives the amount of current the solar array will supply at a particular voltage. Thus, an unstable region of the characteristic is a current level with its associated voltage level or a voltage level which is particular associated current level which cannot be achieved when the array is connected to an inverter of either the current control or voltage control type, operating in a constant power mode.

Although stable operation can be achieved with a current source or voltage source inverter connected to a solar array if operation is confined to the stable portions of the array, stability problems will be encountered if maximum power is attempted to be drawn from the array during rapid changes of insolation levels which may abruptly change the operating point of the solar array characteristic to the unstable regions.

It is an object of the present invention to control an inverter of either the voltage controlled or current controlled type connected to a solar array so that maximum power is drawn from the solar array at varying levels of insolation.

It is a further object of the present invention to assure static stability even during rapid insolation changes which may abruptly change the inverter operating point from one side of the solar array I-V characteristic to the other.

SUMMARY OF THE INVENTION

A control is provided for obtaining maximum power from a solar array connected by a power converter to a load such as a utility grid or batteries. An array voltage is sensed and a commanded array current proportional to the array voltage is obtained from a variable gain device. The array current is also sensed and subtracted from the commanded array current in a summer compensator which provides a line current magnitude command to the inverter. When the load is a utility grid the line current magnitude command multiplies a sinusoidal signal at the utility frequency in phase with the utility voltage to form a command to the dc to ac converter. When the load is a battery the line current command is the command to the dc to dc converter. The converter is commanded to draw array current from the array. The power supplied to the load is repeatedly sensed to determine whether it is increasing or decreasing. The gain of the variable gain device is changed in one direction as long as the power supplied to the load is sensed to be increasing, and the gain is changed in an opposite direction whenever the power supplied to the load is sensed to decrease. This causes maximum power to be drawn from the array.

BRIEF DESCRIPTION OF THE DRAWING

The features of the invention believed to be novel are set forth with particularity in the appended claims. The invention itself, however, both as to organization and method of operation together with further objects and advantages thereof, may best be understood with reference to the following description taken in conjunction with the accompanying drawing in which:

FIGS. 2A and 2B is a solar array characteristic and equivalent circuit of a voltage controlled inverter connected to an array, respectively;

FIGS. 3A and 3B is a solar array characteristic and an equivalent circuit of a current controlled inverter connected to a solar array, respectively;

DETAILED DESCRIPTION OF THE DRAWINGS

Figure 1:
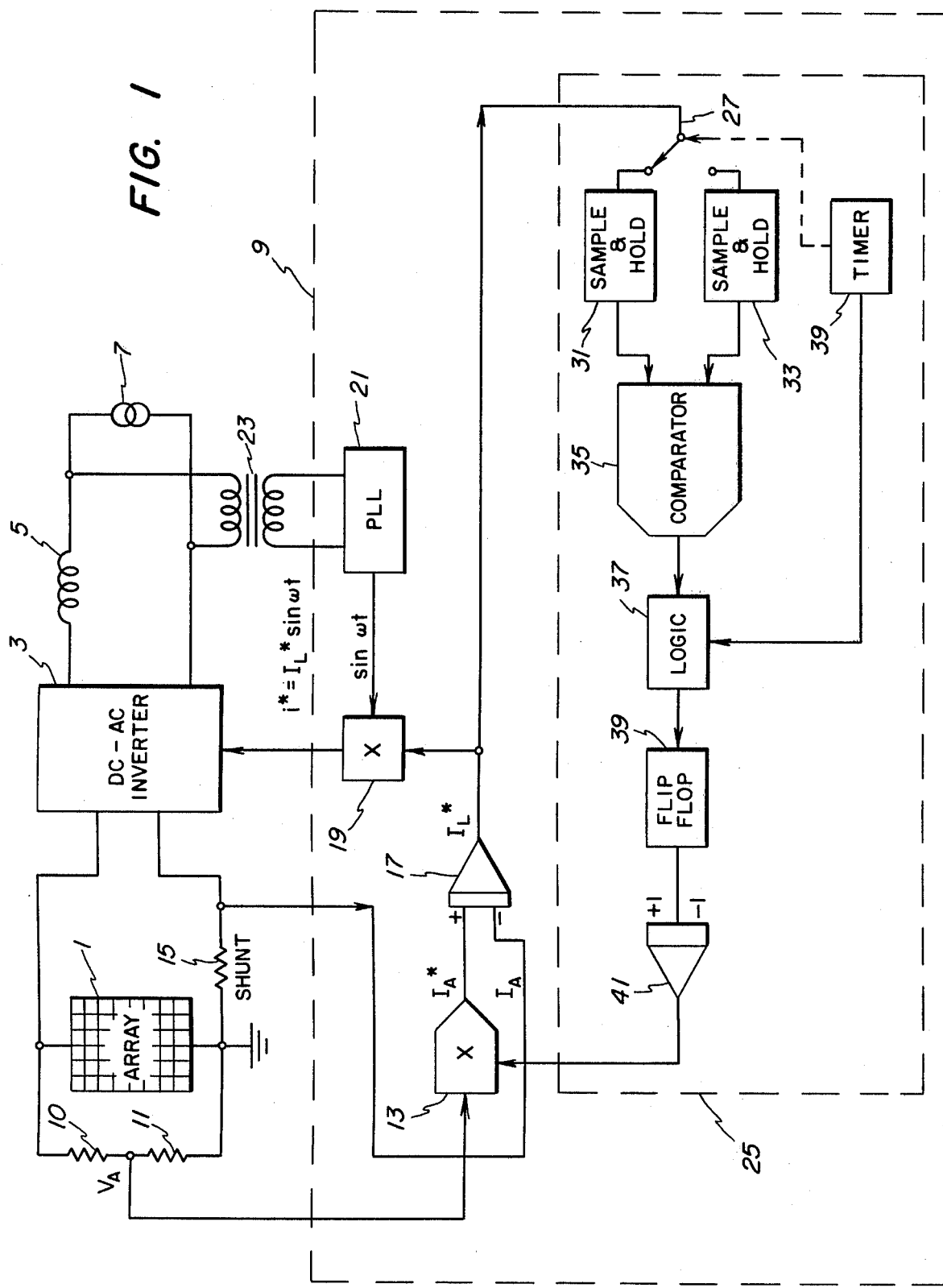
FIG. 1 is a part schematic, part block diagram of one embodiment of the maximum power control for a solar array for connecting a solar array to a utility grid.

Referring now to the drawings and particularly FIG. 1 thereof, a solar array 1 is shown providing dc power to a dc to ac inverter 3, which may be a current controlled or voltage controlled inverter, operated in the constant power mode. Examples of suitable inverters are shown in my copending U.S. application Ser. No. 334,844, filed Dec. 12, 1981, assigned to the same assignee as the present invention. The copending application is hereby incorporated by reference. The ac output of the inverter is coupled through an inductor 5 to a utility grid shown as an ac power source 7. A control 9 for providing a command for drawing maximum power from the solar array at varying levels of insolation and providing sinusoidal current of the same frequency and in phase with the voltage waveform of the utility grid, receives array voltage from a voltage divider made up of resistors 10 and 11 connected across the output of the array 1. The signal proportional to the array voltage is supplied to a variable gain amplifier 13. The output signal of the amplifier is an array current command $I_A^*$ proportional to the array voltage. The array current is sensed by a shunt 15 in series between the array 1 and the dc to ac inverter. A summer-compensator, shown in FIG. 1 as an integrator 17 having an inverting and noninverting input, has at its noninverting input terminal an input signal of commanded array current $I_A^*$ and at its inverting input terminal the array current $I_A$. The output signal of the integrator is a line magnitude command $I_L^*$ supplied to one input of multiplier 19. Supplied to the other input of integrator 17 is a sinusoidal signal sin ωt in phase with line voltage from a phase locked loop 21 which is transformer coupled by a transformer 23 across the series combination of inductor 5 and the output of the inverter 3. The product from multiplier 19 is the command $i_L^*$ which equals $I_L^* \sin \omega t$. The command $i_L^*$ commands the inverter so that the commanded array current $I_A^*$ is drawn by the inverter and a sinusoidal current waveform in phase with, and having the same frequency as, the voltage waveform of the utility is fed to the utility grid. Thus, a unity power factor is presented to the utility grid.

The magnitude command $I_L^*$ is also supplied to a circuit 25 for maximizing the power drawn from the array. The magnitude command $I_L^*$ is supplied through a switch 27, controlled by a timer 29, alternately to sample and hold circuits 31 and 33, which receive the magnitude command. The output of each of the sample and hold circuits is connected to a comparator 35. The output of the comparator 35 is coupled to a logic circuit 37, which also receives an input from timer 39. The output signal of the logic circuit 37 triggers a flip-flop 39, which in turn is connected to an integrator 41. The integrator provides a constantly changing output whose direction of change is increasing for one state of the flip-flop and decreasing for the other state of the flip-flop. The output of the integrator is connected to a variable gain amplifier 13 and adjusts the variable gain of amplifier 13.

The operation of FIG. 1 will now be described with references to FIGS. 2A and 2B and FIGS. 3A and 3B. FIG. 2A shows an I-V characteristic for a solar array for a particular level of insolation and temperature. FIG. 2B is a circuit showing the nature of the load provided by a voltage source inverter 6. FIG. 3A shows an I-V characteristic for a solar array for a particular level of insolation and temperature, and FIG. 3B is a circuit showing the nature of the load that current source inverter 6 presents to a solar array. Referring to FIG. 2B, the voltage source inverter operated in the constant power mode is shown as a capacitor C (i.e. the dc filter for the inverter) in parallel with a constant power sink. The array, filter capacitor and inverter all have the same applied voltage as indicated by the vertical broken lines in FIG. 2A. The stability conditions cn be determined by perturbing the voltage away from the intersection points of the inverter constant power hyperbolas (only one of which is shown) and array characteristics and observing in which direction the current unbalance $i_C$ (which is carried by the capacitor) drives the capacitor voltage. Using this method it is clear that the stable operating point is on the right side (constant voltage side) of the array I-V curve. For example, operation along either voltage lines B or D will cause the capacitor current to drive the dc voltage toward the upper intersection point with the constant power hyperbola. Operation at the voltage indicated by line A will draw current from the capacitor causing the array voltage to collapse to zero and operate at its short circuit current value. The intersection with voltage line A at the constant current part of the I-V curve is therefore unstable.

The inverse situation is true for a current source inverter, as seen in FIGS. 3A and 3B. In this case, the array current must equal the inverter input current, and any unbalances between array and inverter power show up as voltage differences across the inductance L which tends to change the current. A similar argument as above is used to show that the stable operating point is at the intersection of the constant power hyperbola and the array characteristic on the constant current side of the curve. For example, operation along the current lines E or F will cause an unbalance in inductor voltage, $V_L$, which will change the current so that the operating point is driven back to the constant current intersection point. Similarly, operation along the current line G will cause the inductor current to decrease, thus driving the array to its open-circuited voltage point.

By similar reasoning, resistive loading (e.g., $R_1$ or $R_2$ in FIG. 2A or 3A) of the array is stable, independent of operating point. The equivalent circuit for resistive loading is a series circuit of the array and a resistor. The varying resistive load does not result in the inverter operating in the constant power mode. There are no reactive components in the equivalent circuit. Thus, if either type of inverter is controlled so that the array circuit is proportional to the array voltage or controlled so that the array voltage is proportional to the array current (i.e. the inverter made to appear as a resistive load to the array), then static stability is guaranteed no matter what the operating point. With stability guaranteed, a perturb-and-observe method of maximum power tracking can be used in which the operating point is incrementally changed in one direction and then the other until maximum power is obtained.

Control 9 in FIG. 1 receives the array voltage signal and generates an array current command $I_A^*$ proportional to the voltage of the array. The proportional factor (i.e. the equivalent resistance loading the array) is arrived at from circuit 25 which will be explained hereinafter. The commanded array current and measured array current are compared and the difference integrated in integrator 17. The output of integrator 17 is a magnitude command $L_L^*$ which is the desired magnitude of the current output of the inverter. The phase locked loop generator 21 provides a pure sinusoidal signal without any of the harmonics or transients that may be present on the utility line and the sinusoidal signal is multiplied by the magnitude command $L_L^*$ to generate a command i* to the dc to ac inverter. Commanded current magnitude $I_L^*$ is also used in circuit 25 as a signal proportional to the power delivered to the utility grid. Since the AC line current delivered by the inverter is in phase with the utility current, maximum power corresponds to the maximum current delivered by the inverter. Though commanded current is used in the present embodiment, actual line current could also be used.

The signal $I_L^*$ alternately by circuits 31 and 33, dependent on switch 27 which in turn is controlled by timer 39. After a new value of $I_L^*$ is sampled in either of the sample and hold circuits, it is compared to the previous value in comparator 35. The logic circuit 37, also having a timer input, keeps track of which sample and hold circuit has the most recent sample so that consistent results are obtained. The integrator circuit 41 provides a constantly changing output whose direction of change is increasing for one state of the flip flop 39 and decreasing for the other state. The output of the integrator controls the gain of the variable gain amplifier 13 and thus the current and power drawn from the array 1. Assuming for the moment that the last comparison indicated that the power delivered to the load was increasing (i.e. the line current increasing), then, if the next sample continues to indicate that power is still increasing, the flip-flop 39 would not change state and the integrator 39 would either continue to increase or decrease depending on the present mode of the flip-flop.

Eventually, the resistive load line of FIGS. 2A or 3A reaches a value corresponding to the maximum power point and passes through it. The load point is the intersection of a resistive load line and the I-V characteristic, since the load is made to appear resistive by forcing the array current to be proportional to the array voltage. The resistive load line moves about the origin of the characteristic, since changing the proportionality factor between array voltage and array current changes the equivalent value of the resistance.

When the maximum power point is reached and passed through by the resistive load line, the next sample of $I_L^*$ indicates to the comparator 35 and logic circuit 37 that the power (i.e. line current) has decreased from the preceding sample and therefore the flip-flop 39 changes state. When the flip-flop changes state, the integrator 41 begins decreasing if it had been previously increasing, or increasing if it had been previously decreasing, causing the load line of FIG. 2A or 3A to reverse movement and return toward the maximum power point. From this time on, the load line will cycle back and forth around the maximum power point, reversing direction each time it moves far enough to indicate a decrease in power. If the array characteristic changes due to a change in level of insolation or temperature, automatic adjustment restores the operating point to the maximum power position.

Figure 4:
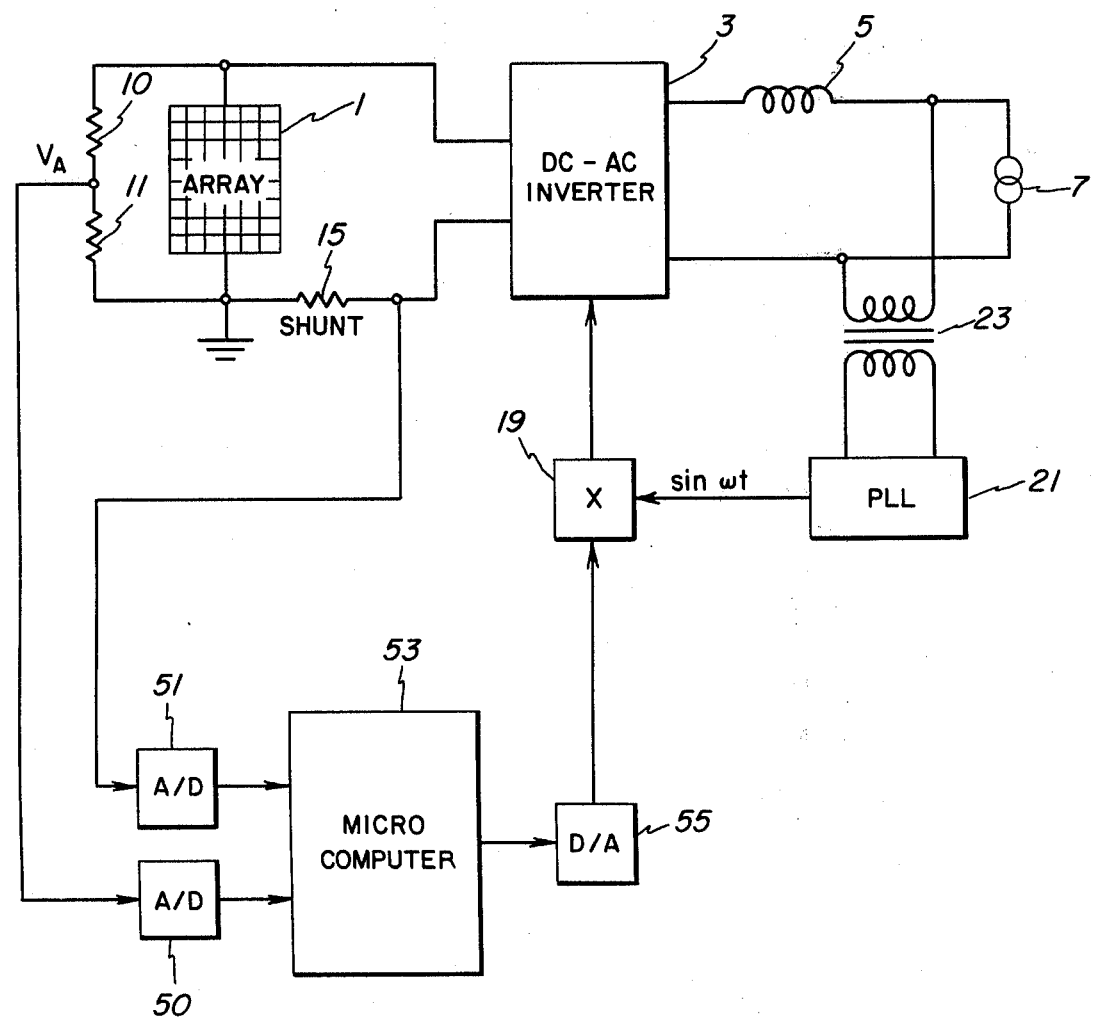
FIG. 4 is a part schematic-part block diagram of another embodiment of the maximum power control for a solar array connected to a utility grid.

Referring now to FIG. 4 a block diagram of another embodiment of the present invention using a microcomputer is shown. As in FIG. 1, a solar array is connected to a DC to AC inverter 3, and the output of the inverter is connected through an inductor 5 to a utility grid shown as an AC power source 7. A voltage divider, made up of resistors 10 and 11, is coupled across the array and provides an input to an analog-to-digital (A to D) converter 50 proportional to the array voltage. A shunt 15 in series between the array and the inverter provides an input proportional to the array current $I_A$ to A to D converter 51. The digital output of the two converters is connected to a microcomputer 53. The output of the microcomputer 53 is a digital line current command which is provided to a digital-to-analog (D to A) converter 55. The output of the D to A converter is multiplied by a sine wave having the same frequency, and in phase with, the utility voltage which is obtained from phase locked loop 21. The phase locked loop receives an input signal of utility voltage from a transformer 23.

Figure 5:
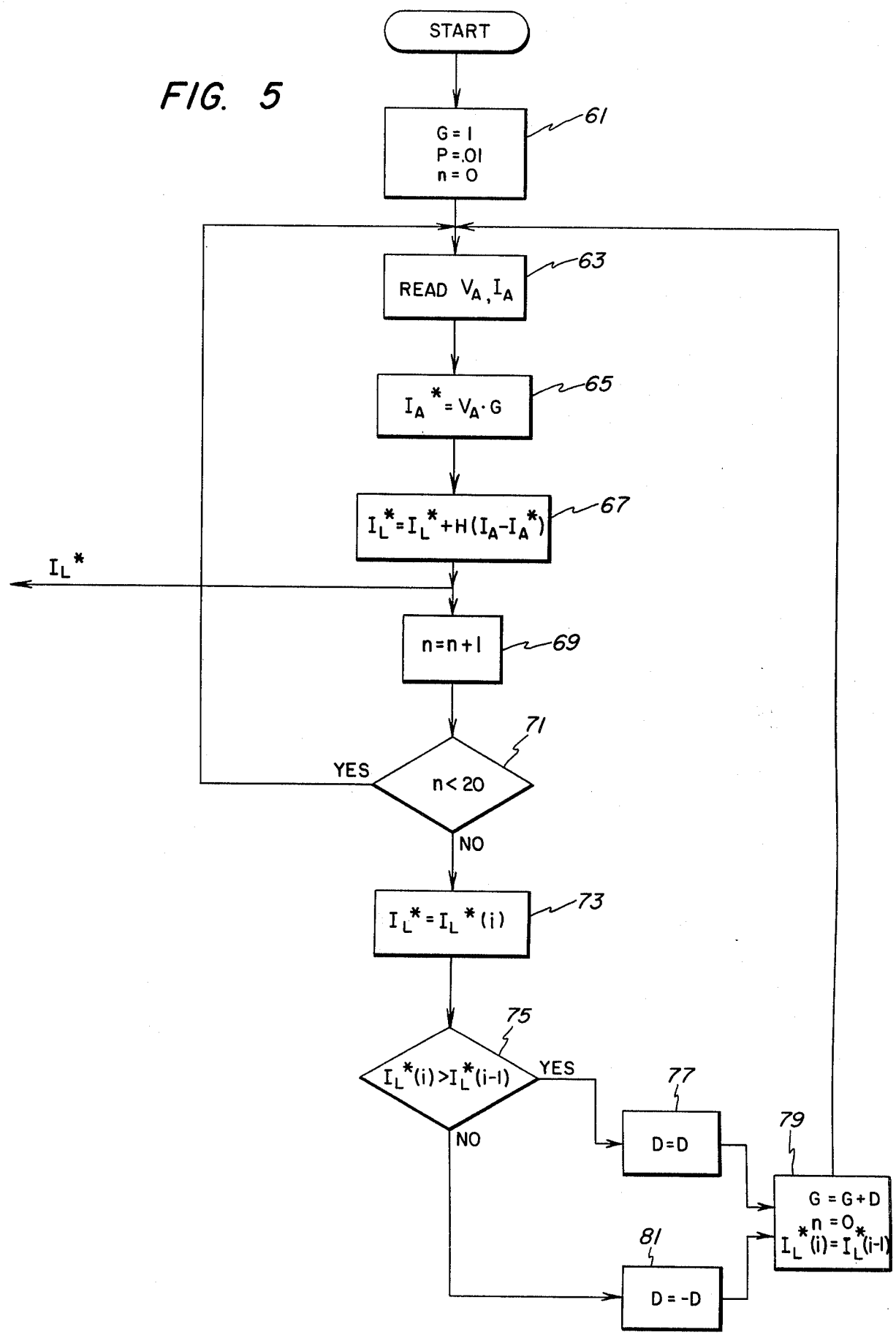
FIG. 5 is a flow chart helpful in explaining the operation of FIG. 4.

A flow chart of microcomputer 53 operation is shown in FIG. 5. The flow chart has two loops, one loop consisting of blocks 63, 65, 67, 69 and 71 for generating an array current command from the array voltage, and a second loop consisting of blocks 71, 73, 75, 77, 81, 79, 65, 67, 69 for drawing maximum power from the array. In block 61 initial conditions are set which include setting a gain G to a predetermined value greater than zero. In block 63, the value of the array voltage and current are obtained from A to D converters 51 and 55, respectively. In block 65, array voltage is multiplied by the gain G to obtain a current command proportional to the voltage. Drawing an array current proportional to the array voltage makes the load connected to the array appear resistive. A magnitude command for controlling the magnitude of the current supplied by the inverter 3 to the utility 7 is determined in block 67 from the difference between command array current and measured array current times the proportionality factor H. This is added to the previous value of $I_L^*$. Thus, when the commanded value of $I_A^*$ is achieved, the magnitude of command $L_L^*$ remains constant. The magnitude command $I_L^*$ is supplied to a D to A converter 55. In block 69 the counter n is incremented and compared to a predetermined constant which controls the relative speed of response of the two loops. It is generally desirable to have a faster response time for the loop which generates an array current from the array voltage and therefore this loop is run more frequently. When n in block 71 is less than a predetermined value (shown as 20 in FIG. 5), the sequence of block 63, 65, 67, 69 is repeated. When n is greater or equal to a predetermined constant, the latest value of $I_L^*$ is read into block 73 and compared to the previous value of $I_L^*$ the last time the maximum power tracker loop was run. If $I_L^*$ has increased as determined in block 75, which means that power supplied to the utility grid has increased, then gain G is changed still further by a predetermined increment determined from block 77 in block 79 in the same direction as it was previously. If, as determined in block 75 the command $I_L^*$ is less than the amount when the loop was last run, then the gain is changed by a predetermined increment determined from block 81 and block 79 in a direction opposite to the direction it was previously changed. Block 79 also resets the counter of n to zero and saves the value of $I_L^*$ for a comparison to the new value of $I_L^*$ the next time it is run. The gain G is then used in gain block 65 until a new value of gain is determined.

As can be seen from FIGS. 2A or 3A, by changing the resistor load line as long as the power increases, it will cause the maximum power point to be reached and the control will oscillate about the maximum power point by the amount added or decremented to the gain. Should the level of insolation change, causing the characteristic to shift, the resistive load line would change first because of the current command being proportional to the voltage and second, because the maximum power control would then change the resistive load line to maximize the power drawn from the array having the new characteristic.

Figure 6:
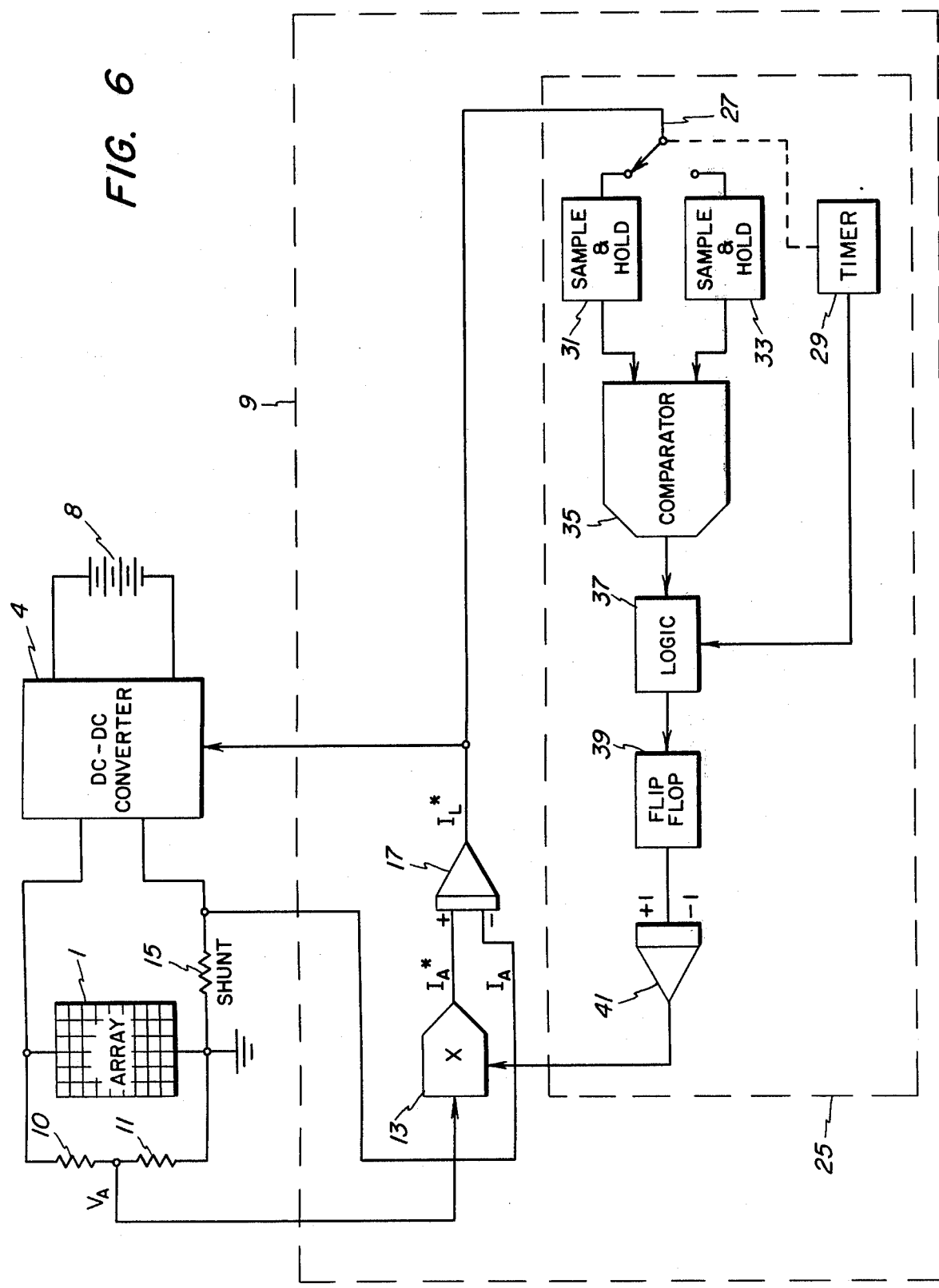
FIG. 6 is a part schematic-part block diagram of a maximum power controller for a solar array connected to a dc supply.

Referring now to FIG. 6 a maximum power controller for a solar array connected to a dc supply through a dc to dc converter is shown. While a solar array could be connected directly to a dc load such as a battery, maximum power would not be obtained from the array for all temperatures or levels of insolation.

The circuit of FIG. 6 is the same as that shown in FIG. 1 except that a dc to dc converter 4 has been substituted for the dc to ac inverter 3, the inductor 5 is not used, dc power source 8 is used instead of an ac power source 7 and the phase locked loop 21 together with transformer 23 and multiplier 19 are not used. The operation and configuration is as described in connection with FIG. 1. The output of control 9, a line current magnitude command $I_L$, is used as the command for the dc to dc converter 4. The magnitude of the current supplied to the dc power source 8 (which can be a bank of batteries) is proportional to the power delivered to the batteries. Maximum power is drawn from the array by controlling the gain of amplifier 13 and the stability of the array is assured by keeping the commanded array current proportional to the array voltage. The phase locked loop is not necessary since there is a dc load.

The foregoing describes a control for obtaining maximum power from a solar array at varying levels of insolation and temperature. Even during rapid insolation changes which may abruptly change the inverter operating point from one side of the solar array I-V characteristics to the other, static stability is insured.

It is understood that the foregoing detailed description is given merely by way of illustration and that many modifications may be made therein without departing from the spirit or scope of the present invention.

What is claimed is:

1. A control for providing maximum power from a solar array for varying levels of insolation and temperature, said solar array interfaced to a load by a power converter, said control comprising:
   means for providing a signal proportional to the array voltage;
   means for providing a signal proportional to the array current;
   variable gain means receiving said array voltage signal and providing a commanded array current proportional to the array voltage;
   means for supplying a command to said power converter to draw commanded array current from said solar array;
   means for varying the gain of said variable gain means to draw maximum power from said array, said means including means for repeatedly sensing whether the power supplied by the power converter to the load is increasing or decreasing, and means for changing the gain of said variable gain means in one direction as long as the power to the load is sensed to be increasing and changing the gain of said variable gain means in an opposite direction whenever the power supplied to the load is sensed to be decreasing.

2. A control for providing maximum power from a solar array for varying levels of insolation and temperature, said solar array interfaced to a load utility grid by a dc to ac inverter, said control comprising:
   means for providing a signal proportional to the array voltage;
   means for providing a signal proportional to the array current;
   variable gain means receiving said array voltage signal and providing a commanded array current proportional to the array voltage;
   means for supplying a command to said dc to ac inverter to draw commanded array current from said solar array and provide sinusoidal current at the utility frequency to the utility grid, said means having
      summer compensator means taking the difference between commanded and actual array current and providing an output current magnitude command to maintain commanded array current;
      means for providing a signal in phase with utility voltage; and
      means for adjusting the signal in phase with utility voltage by said magnitude command to provide a dc to ac inverter command;
   means for varying the gain of said variable gain means to draw maximum power from said array, said means including means for repeatedly sensing whether the power supplied by the inverter to utility grid is increasing or decreasing; and
   means for changing the gain of said variable gain means in one direction as long as the power to the utility grid is sensed to be increasing and changing the gain of said variable gain means in an opposite direction whenever the power supplied to the utility grid is sensed to be decreasing.

3. The control of claim 2 wherein said means for providing a signal in phase with the utility voltage comprises a phase locked loop transformer coupled to the utility voltage.

4. A control for providing maximum power from a solar array for varying levels of insolation and temperature, said solar array interfaced to a dc source by a dc to dc converter, said control comprising:
   means for providing a signal proportional to the array voltage;
   means for providing a signal proportional to the array current;
   variable gain means receiving said array voltage signal and providing a commanded array current proportional to the array voltage;
   means for supplying a command to said dc to dc converter to draw commanded array current from said solar array; and
   means for varying the gain of said variable gain means to draw maximum power from said array, said means having
      means for repeatedly sensing whether the power supplied by the dc to dc converter to the dc source is increasing or decreasing; and
      means for changing the gain of said variable gain means in one direction as long as the power to the dc source is sensed to be increasing and changing the gain of said variable gain means in an opposite direction whenever the power supplied to the dc source is sensed to be decreasing.

5. The control of claims 1 or 4 wherein said means for supplying a command comprises summer compensator means taking the difference between commanded and actual array current and providing an output current magnitude comand to maintain commanded array current.

6. The control of claims 1, 2 or 4 wherein said means for repeatedly sensing includes an input of commanded line current which is repeatedly sensed to determine whether the power supplied is increasing or decreasing.

* * * * *